July 15, 1947.　　　A. B. METSGER　　　2,423,843
SUCTION SERVOMOTOR WITH FOLLOW-UP DEVICE
Filed July 1, 1943

INVENTOR
ALFRED B. METSGER,
BY
ATTORNEY

Patented July 15, 1947

2,423,843

UNITED STATES PATENT OFFICE 2,423,843

SUCTION SERVOMOTOR WITH FOLLOW-UP DEVICE

Alfred B. Metsger, United States Navy

Application July 1, 1943, Serial No. 493,140

1 Claim. (Cl. 121—41)

(Granted under the act of March 3, 1883, as amended April 30, 1928; 370 O. G. 757)

The present invention relates to a suction servo force multiplier or device designed to produce a motion nearly equal to that of a straight line input of motion, but with much greater force, and deriving operating power from a suction, and from a gas under pressure in which the whole device operates.

Expressing the above in more specific terms, a device is provided which is provided with a casing or body having an operating cylinder chamber, slidably operating on a fixedly mounted piston. An extension on the said casing encloses a valve chamber, with ducts connecting the two chambers, and an axially moving plunger slidably operating in the valve chamber, its motion being controlled by any separate means and constituting the input to this device, and adapted to close the ends of the connection ducts to control the output of the force multiplier.

When the device is quiescent and the valve chamber plunger is in a position equally restricting the ends of the connection ducts where they enter the valve chamber, the pressure in both ends of the cylinder casing is substantially equal to that in the suction line. But when the valve chamber plunger is moved to further uncover the valve chamber end of one of the connection ducts, the pressure in the ends of the cylinder is made unequal on the opposed sides of a piston therein, by the inflow of gas of a higher pressure, such as the atmosphere, through the valve chamber and said connection duct. In which event, the cylinder casing moves along on the fixed piston, and motion of the whole body of the device takes place in a straight line motion which can be used to drive a connecting rod or other means of utilization of the power output in accordance with the valve chamber plunger. The exact nature of the invention will be more particularly described and its advantages explained as the specification proceeds herein.

In the accompanying drawings forming part of the present specification:

Figure 1:
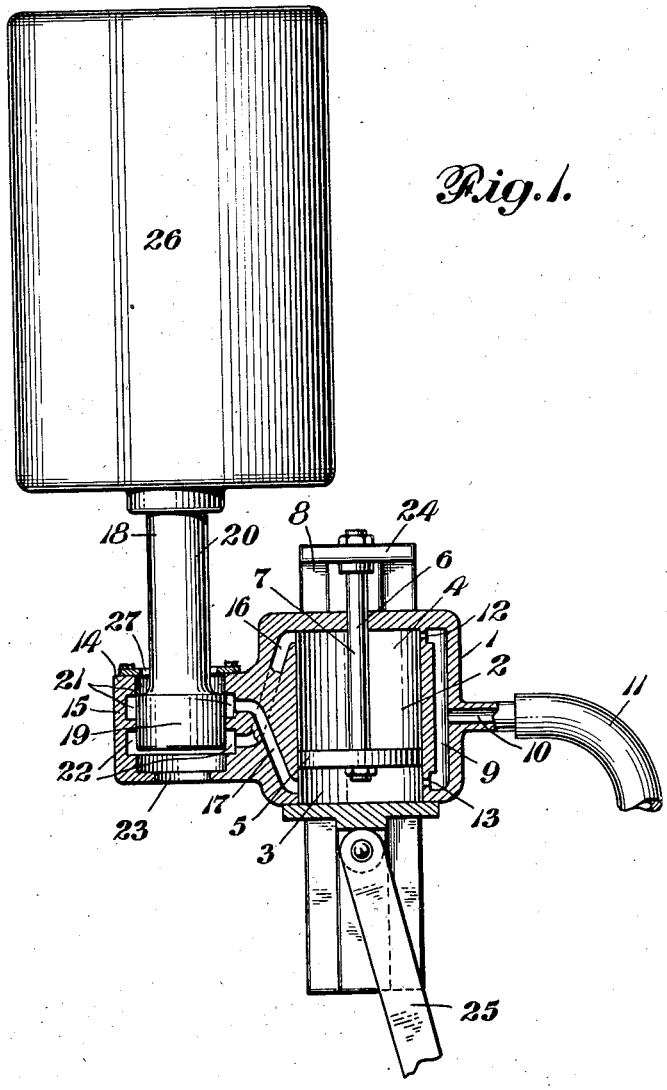
Fig. 1 is a horizontal central longitudinal section of the device taken on line 1—1 of Fig. 2.
Figure 2:
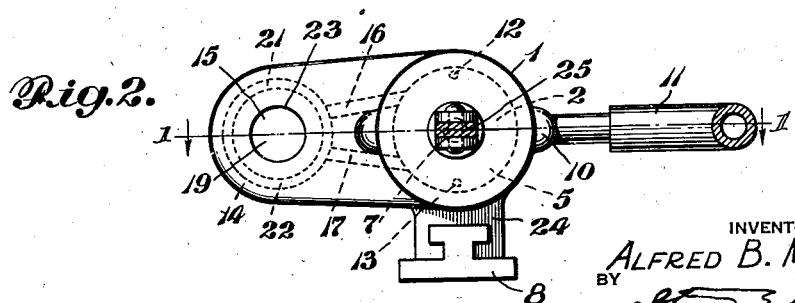
Fig. 2 is an end view of the exterior of Fig. 1.

In the drawings the numeral 1 indicates a cylinder body or casing which contains the cylinder operating chamber 2, which is divided into two subsidiary chambers 3 and 4 by the piston head 5, which last is carried on the piston rod 6 and forms a piston.

The piston as seen from Fig. 1 of the drawings is fixed to a suitable base 8 by means of piston rod and the upright 24, but the cylinder body 1 slidably operates on the piston head 5.

The cylinder body 1, has an air or gas exit passage 9, with an exit port 10, through which air or gas may be exhausted by the suction pipe 11. A pair of restricted area orifices 12 and 13 are provided for permitting gas or air to flow from the respective sub-chambers 4 and 3 of the piston chamber 2.

The casing 1 has an extension 14 in which is located a valve chamber 15, and a pair of air ducts or passages 16, 17, through which air may be admitted from the valve chamber 15 to the operating chambers 4 and 3 respectively.

In the valve chamber 15 is located an input plunger 18 having a head 19, and a stem 20, and it is seen the stem of said plunger is operated by some external motion appliance such as 26.

The annular grooves 21, 22 in extension 14 slidably operate with respect to the plunger head 19. The valve chamber 15 has an orifice 23, and also another 27 around plunger stem 18, at the top of the valve chamber, through which air or gas coming from the surrounding region passes to annular grooves 22 or 21 respectively, except that it will be noted the plunger head 19 when in a neutral position restricts the flow of air through the ducts 16 and 17 to a negligible amount. When said flow is negligible through ducts 16 and 17, the pressures in the operating chambers 3, 4 are equal to the pressure in the suction air line 11. The motion of said body 1, is used to drive a pivoted connecting rod 25 or other means of power output for the device.

When the plunger 18 and head 19 leave the equilibrium position as shown, one of the grooves 21 or 22 is opened, admitting gas to one of the operating chambers 3 or 4. Since the admission port 23 or 27 is much larger than the corresponding restricted passage 12 or 13, the pressure in the connecting chamber approaches the pressure of the gas surrounding the device and admitted through orifice 23 or 27 to the annular groove 22, or 21 and duct 16 or 17.

The resulting pressures in chamber 3 or 4 move the body casting 1 to follow the plunger 18, until the plunger and body casting 1, are again in the equilibrium relation.

Since the motion of the body 1 in a straight line over piston 5 may be used to drive a connecting rod 25 or other means of output of mechanical power, it is seen a motion and power equal to that of a straight line input is obtained by the present device but with much greater force deriving operating power from suction of air or gas, and the surrounding gas pressure, in which the device is located.

The invention described herein may be manufactured and used by or for the Government of the United States of America for governmental purposes without the payment of any royalties thereon or therefor.

I claim:

A double acting piston and cylinder unit in which the main piston is stationarily fixed by means of a rigidly mounted piston rod passing through one end of the cylinder, and the cylinder is slidably mounted for delivering a force axially within the limits of the piston chamber, the opposite ends of said chamber being connected by restricted ports to a common suction line, a piston valve having a casing integral with said cylinder and comprising a piston and stem for movement parallel to said cylinder, a bore for said valve piston terminating in shoulders for limiting the movement of said valve piston therein and having a pair of axially-spaced annular grooves unrestrictedly connected by ports to opposite ends of the main piston chamber, the outer edges of said annular grooves being spaced at a slightly greater distance than the length of the valve piston whereby when the valve is in neutral position, reduced but equal pressures will result on both sides of the main piston and when the valve is moved in either direction from neutral position, atmospheric pressure on the corresponding side of the main piston will cause the cylinder to deliver a substantial force in the same direction, depending on the diameter of the piston chamber, for the same distance, whereupon the valve will again assume the neutral position to stop the movement of the cylinder.

ALFRED B. METSGER.

REFERENCES CITED

The following references are of record in the file of this patent:

UNITED STATES PATENTS

| Number | Name | Date |
|---|---|---|
| 136,493 | Dungan | Mar. 4, 1873 |
| 1,353,114 | Edwards | Sept. 14, 1920 |
| 1,598,650 | Levine | Sept. 7, 1926 |
| 1,861,529 | Harding | June 7, 1932 |
| 1,887,335 | Sperry | Nov. 8, 1932 |
| 1,902,356 | De Monge | Mar. 21, 1933 |
| 1,928,144 | Vickers | Sept. 26, 1933 |
| 2,107,357 | Wood | Feb. 8, 1938 |
| 2,345,531 | de Ganahl | Mar. 28, 1944 |
| 2,353,692 | Cunningham | July 18, 1944 |

FOREIGN PATENTS

| Number | Country | Date |
|---|---|---|
| 667,353 | France | 1929 |